Mar. 27, 1923.
E. S. D. VON SEGEBADEN.
FEED DEVICE FOR VENEER CUTTING MACHINES, LATHES, CUTTING MACHINES, AND THE LIKE.
FILED SEPT. 27, 1922.
1,449,798.
2 SHEETS—SHEET 1.
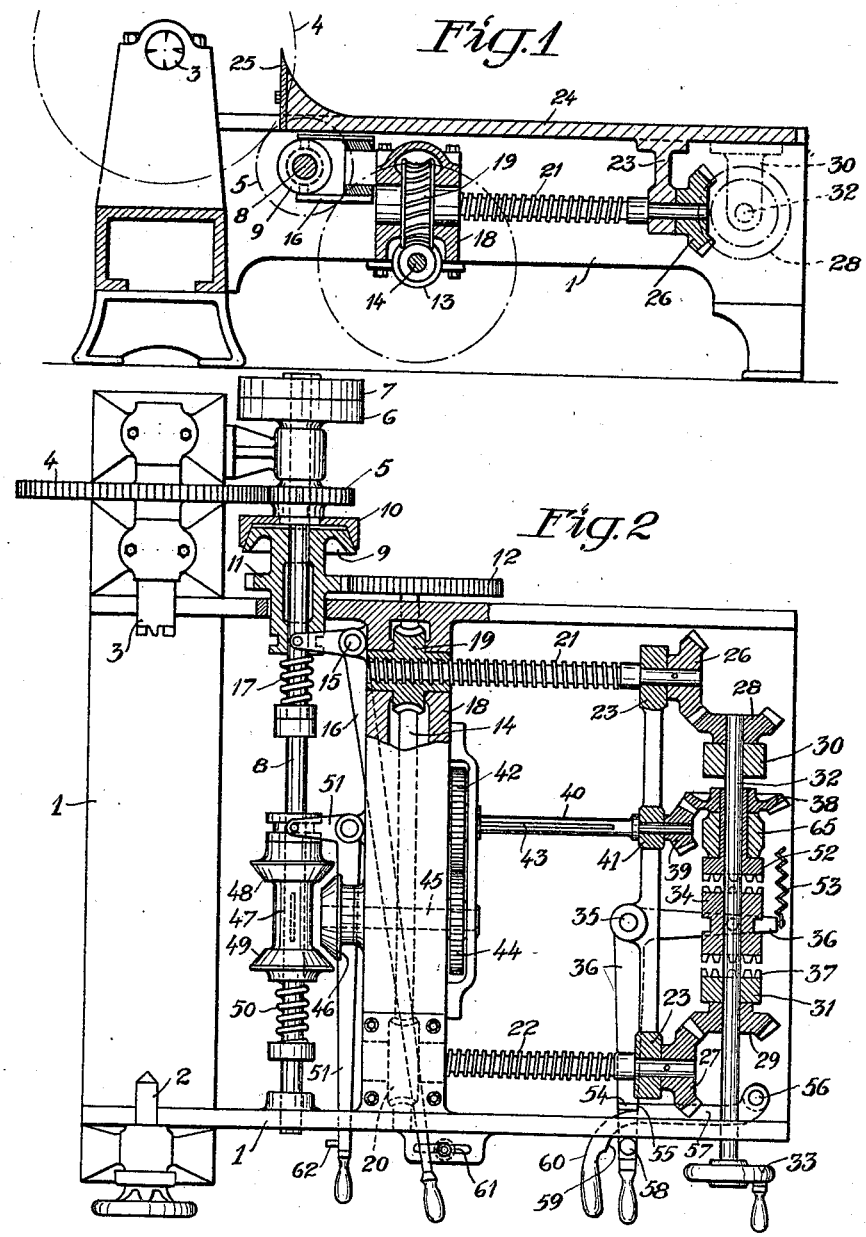
Inventor:
E. S. D. von Segebaden
By Marker Clark
Atty's Mar. 27, 1923.　　　　　　　　　　　　　　　　　　　　1,449,798.
E. S. D. VON SEGEBADEN.
FEED DEVICE FOR VENEER CUTTING MACHINES, LATHES, CUTTING MACHINES, AND THE LIKE.
FILED SEPT. 27, 1922.　　　　　　　　　2 SHEETS—SHEET 2.
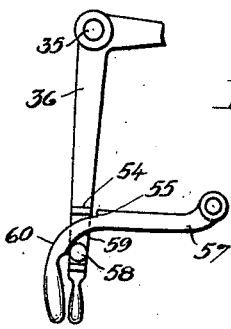
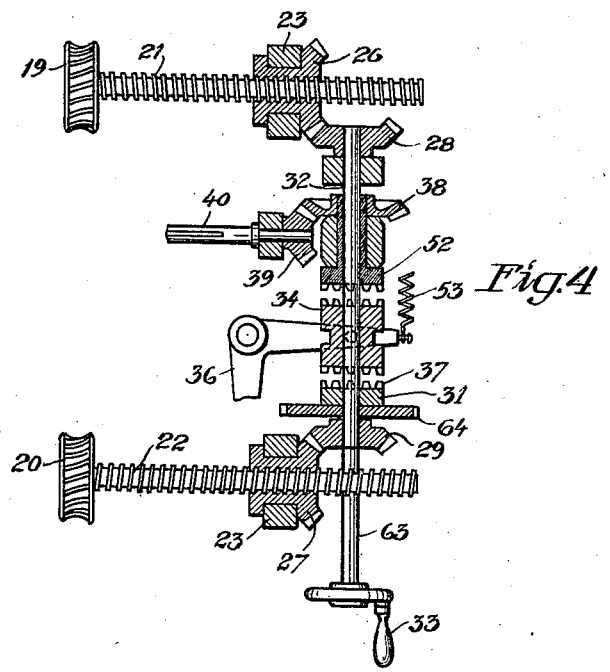

Patented Mar. 27, 1923.

1,449,798

UNITED STATES PATENT OFFICE.

ERNST SIGURD DETLOF von SEGEBADEN, OF DJURSHOLM, SWEDEN, ASSIGNOR TO AKTIEBOLAGET GERH. AREHNS MEKANISKA VERKSTAD, OF STOCKHOLM, SWEDEN, A CORPORATION OF SWEDEN.

FEED DEVICE FOR VENEER-CUTTING MACHINES, LATHES, CUTTING MACHINES, AND THE LIKE.

Application filed September 27, 1922. Serial No. 590,956.

*To all whom it may concern:*

Be it known that I, ERNST SIGURD DETLOF VON SEGEBADEN, a subject of the King of Sweden, residing at Strandvagen 5, Djursholm, Sweden, have invented certain new and useful Improvements in Feed Devices for Veneer-Cutting Machines, Lathes, Cutting Machines, and the like (for which I have filed applications in Germany July 13, 1921; Sweden July 8, 1922; Austria July 8, 1922; Czechoslovakia July 12, 1922; France July 12, 1922 and in England July 13, 1922), of which the following is a specification.

In order that a feed device for the tool-carrying slide of a machine tool may fully serve its purpose it must in the first place be able to effect all those movements of the tool which may be taken into consideration. Further, it must effect the said movements in such manner and by such means as to fulfil in the best manner the objects of the respective movements, which objects may be essentially different during the different steps of the operation. In cutting veneer the following three operation steps always must be taken into consideration, viz:—

1. The advancing of the slide carrying the knife until the knife touches the rotating block and, it may be, after the surface of the same has been peeled off, is able to start the cutting of the veneer;

2. The feeding of the slide during the cutting operation, and

3. The returning of the slide at the end of the cutting operation into such position that a new block can be fixed in the machine.

For the performance of the best work great stress evidently must be laid upon the feeding operation mentioned under heading 2 concerning force and uniformity, while during the two remaining steps of the operation, which are stated under headings 1 and 3 and may be considered necessary intervals during which no useful work is effected in the machine, there are other objects based upon the necessity for saving time and power. In order to obtain the last mentioned object in combination with the possibility for the operator to control the operation in respect to any irregular block in order to cut the greatest possible amount of veneer from the block, it is necessary for the different movements in certain cases to succeed automatically, in other cases to be interrupted in predetermined positions of the slide and sometimes to be controlled by the operator in a desired moment. For practical reasons it is also necessary for the slide to be able to be moved entirely manually, for instance while the machine is disengaged from the motive source.

In machines for cutting veneers hitherto used or proposed either there is no possibility of effecting some of the necessary movements mentioned above mechanically or the feed device is so constructed, that due attention has not been paid to the essentially different movements which during the different steps of the operation are put on the work of the feed and clutch members concerning continuous function as well as disconnection or reversing.

This invention relates to a feed device which renders possible the effecting of all the said necessary operations and in which the members effecting or controlling the movements of the slide are so combined and so used that the several movements may be effected separately and the members operate in accordance with the different demands put on the said movements and without disturbing their simultaneous or successive operations in the feed device. The feeding is effected by a screw gearing, preferably comprising two screw spindles with nuts and so arranged that to the said spindles and nuts, independent of each other, rotary movements are imparted in such direction that by changing the said movements relatively to each other the slide is fed forwards at a rate necessary for cutting a veneer of the desired thickness, returned and advanced rapidly or brought to a standstill. The veneer cutting machine is provided with an automatically operating device which, after the cutting operation has proceeded as far as permitted by the members holding the block, causes the said slide to be returned into its starting position and to stop in the said position. According to a modified form of the invention the arrangement is reversed, so that the screw threaded spindles are rotated continuously.

In the accompanying drawings a veneer cutting machine is shown provided with a feed mechanism for the blade-carrying slide arranged in accordance with this invention, in Figure 1 is a side view, partially in a vertical section, and in Figure 2 is a plan view partially in a horizontal section.

Figure 3 shows a detail.

Figure 4 shows in a plan view partially in a horizontal section a modified form of the feed mechanism.

The block is fixed between a pin 2, adjustable in the frame 1 of the machine, and a rotatable conveyor 3, which is rotated by the driving shaft 8 of the machine by means of a gear 4, 5, the said shaft being provided with a pulley 6 and a loose pulley 7. By shifting laterally the one member 9 of a friction clutch 9, 10, a toothed wheel 11 connected with the member 9 is rotated and turns a toothed wheel 12, fixed to a shaft 14, provided with two worms 13 (one shown in Figure 1). The said member 9 is brought into engagement with the member 10 and out of engagement with the same by means of a hand lever 16, which is pivoted at 15 in the frame of the machine and the fork-shaped arm of which engages a groove provided in the member 9. A spring 17 normally holds the member 9 in engagement with the member 10. Two worm wheels 19 and 20 are journalled in a cross beam 18 of the frame 1 and mesh with the worms 13 respectively of the shaft 14, the said worm wheels constituting the nuts of a spindle 21 with right-handed threads and a spindle 22 with left-handed threads respectively. The said spindles 21 and 22 are parallel and rotatably but not slidably mounted in bearings 23 provided on the lower side of a slide 24 movable in suitable guides. 25 is the cutting blade carried by the said slide. Bevel gears 26 and 27 are fixed to the spindles 21 and 22 and mesh with bevel gears 28 and 29 respectively provided on a shaft 32 which is journalled in bearings 30 and 31 provided on the lower side of the slide 24. The said shaft 32 has a crank handle 33 and on the shaft a claw coupling member 34 is slidable but not rotatable, which by means of a hand lever 36 pivoted at 35 to the slide 24 may be brought into engagement with claws 37 provided on the bearing 31, so that the shaft 32 and thus the screw spindles 21 and 22 are locked against rotation. By means of the motion-transmitting mechanism 9, 10, 11, 12, 13 and 14 the worm wheels and nuts 19 and 20 are rotated continuously and feed the locked screw spindles 21 and 22 and the slide 24 forward at the rate necessary for cutting a veneer from the block. At the releasing of the shaft 32 by disconnecting the coupling 34, 37 the spindles 21 and 22 become free and partake in the rotary motion of the nuts 19 and 20. In consequence hereof the screw spindles 21 and 22 are not moved longitudinally in the nuts 19 and 20 and for that reason the slide 24 will be at a standstill. The returning of the slide 24 into a position suitable for fixing the next block is effected by rotating the screw spindles 21 and 22 by means of the crank 33 and with the aid of the gears 26, 28 and 27, 29 in the same direction in which the nuts 19 and 20 are rotated but at rate which is greater than that of the nuts. After the fixing of the said block, the slide 24 may be advanced rapidly until the blade 25 arrives at the block or engages the same by rotating the screw spindles 21 and 22 by means of the crank handle 33 in a direction opposite to that of the nuts 19 and 20. All the said movements of the slide may take place while the nuts rotate continuously in unchanged direction and without any disturbing influence upon the co-operation of the nuts and the screw spindles or upon the proper feeding operation. This involves the advantage that the motion necessary for the proper cutting operation which always takes place at a comparatively slight velocity but requires great exactness and force may be transmitted to the feed members by means of the gear (worm gear) which is most suitable for the purpose, while such a movement of the feed members as only serves to displace the blade slide and for that reason does not require either exactness or force but instead rapidity and easiness is transmitted by means of gears more suitable for this kind of motion. Owing to the fact that motion is transmitted from the shaft 14 directly to each of at least two parallel spindles 21 and 22 located near the guides for the blade slide, the latter will be moved very uniformly, which results in a uniform thickness of the veneer.

The machine shown in Figures 1, 2 and 3 is provided with means for rotating automatically the shaft 32 and thus the screw spindles 21 and 22 in the one or the other direction. A bevel gear 39 on a shaft 40 meshes with a bevel gear 38, which runs freely on the shaft 32. The said shaft 40 is journalled in a bearing 41 provided on the lower side of the slide 24 and in a bearing provided in the cross beam 18 and slides through the said beam and a toothed wheel 42 held against lateral movement by the beam. The said shaft 40 is by means of a slot 43 and key connected with the toothed wheel 42. The toothed wheel 42 meshes with a toothed wheel 44 fixed to a shaft 45 which is journalled in the cross beam 18 and to which a conical friction disc 46 is fixed. On the driving shaft 8 is slidably but not rotatably mounted a driving roll 47 having two conical friction surfaces 48 and 49 which respectively may be brought into engagement with the disc 46 by sliding the roll 47 on the shaft 8 in the one or the other direction. A spring 50 tends to move the roll 47 in such a direction that its surface 49 is held in engagement with the disc 46. Roll 47 may be shifted by means of a hand lever 51 which is pivoted to the cross beam and the fork-shaped arm of which engages a groove provided in the roll 47. The bevel gear 38 is fixed to the hub of a member 52 slid on the shaft 32 and journalled in a bearing 65 on the lower side of the slide, the said member being provided with claws adapted to engage claws provided on the coupling member 34. A spring 53 fixed to the lever 36 and the slide 24 tends to move the member 34 into engagement with the member 52. In the positions of the parts shown in Figure 2 the shaft 32 rotates freely, in consequence whereof no motion is transmitted to the slide, as stated above. If, the coupling 34, 52 is operative and the friction surface 49 engages the friction disc 46, the roll 47 rotates by means of the described motion-transmitting device the screw spindles 21 and 22 in such direction that the slide is moved backwards. If, on the other hand, the friction roll 47 has been moved by means of the hand lever 51 into such position that its surface 48 engages the friction disc 46, the screw spindles 21 and 22 are rotated in such direction that the slide is advanced rapidly.

The shifting of the levers 36 and 51 may be effected automatically by the machine by the following means:—The coupling member 34 is held in the central position shown in Figure 2 (in which position the shaft 32 is free and no feeding of the slide 24 is effected) by a projection 54 provided on the hand lever 36 and engaging an abutment 55 provided on an arm 57 pivoted at 56 to the lower side of the slide 24. By disengaging the arm 57, which may be effected manually as well as automatically, the coupling member 34 is brought into engagement with the coupling member 52 by the spring 53 so that the slide 24 is returned or advanced in the manner stated above. When the lever 36 has been moved into the position shown in Figure 3 the coupling member 34 engages the claws 37. The said claws 37 and the claws of the member 34 co-operating with the same are so shaped that they hold the member 34 in operative position against the action of the spring 53. On the hand lever 36 a pin or projection 58 is provided, which in the position of the lever 36 shown in Figure 3 bears against a cam surface 59 provided on the arm 57. A second cam surface 60 is provided on the said arm 57 which at the end of the feed movement of the slide strikes an abutment 61 provided on the frame 1. Arm 57 is hereby swung outwards against the action of a spring, not shown, and carries with itself by means of the cam surface 59 and the pin 58 the lever 36, so that the coupling 34, 37 is disconnected and the coupling member 34 is brought into engagement with the member 52 by the spring 53. Before the disengaging of the coupling 34, 37 is effected the arm 57 has been swung outwards for such a distance that the abutment 55 is located outside the path of the projection 54. Owing to the fact that the friction surface 49 is held in engagement with the friction disc 46 the slide 24 is returned immediately at the connection of the coupling 34, 52. The said abutment 61 is fixed to the frame 1 preferably in an adjustable manner so that the point at which the slide is stopped during the feeding of same and then returned may be changed with regard to the size of the conveyor 3, so that the blade 25 does not strike the same. While the slide 24 is returned, a projection or arm 62 provided on the same strikes the lever 51 so that the roll 47 is brought into the central position shown in Figure 2 and the slide is stopped. After the fixing of the new block in the machine, the operator moves the friction surface 48 into engagement with the friction disc 46, while the coupling 34, 52 remains in connected position. The slide is then advanced rapidly to the block. The operator then releases the lever 51 and connects the coupling 34, 37 by means of the lever 36 so that the slide is again fed forward and the cutting of the next veneer is effected. By disconnecting the coupling 9, 10 the worm wheels or nuts 19 and 20 are stopped and the feeding of the slide is interrupted.

In the form of invention shown in Figure 4 the worm wheels 19 and 20 are firmly connected with the screw spindles 21 and 22 which in this case are stationarily journalled in the frame of the machine. The bevel gears 26 and 27, journalled in the bearings 23 provided on the slide, are constructed as nuts co-operating with the screw spindles 21 and 22. The parts 28, 29, 32, 34, 36, 37, 40, 52 and 53 are the same as those shown in Figures 1 and 2. For the rotating of the shaft 32 manually the crank handle 33 is mounted on a special shaft 63 journalled in the slide and provided with a toothed wheel meshing with a toothed wheel 64 on the shaft 32. Owing to the said arrangement the screw spindles 21 and 22 may extend beyond the ends of the shaft 32. The feeding of the slide, the interruption of the feeding operation, the returning of the slide and advancing of the same rapidly is effected in just the same manner as in the machine shown in Figures 1 and 2 except that the toothed wheels 26 and 27, shown in Figure 4 and constituting nuts, move, when rotated, the slide backwards and forwards rapidly.
While the toothed wheels 26 and 27 are locked by the coupling 34, 37, the slide is advanced at the rate necessary for the cutting of the veneer and while the shaft 32 is free, no feeding of the slide is effected.

The invention may evidently be applied also to ordinary lathes, cutting machines and so on and may be modified in many respects without exceeding the limits of the invention. For instance, couplings of other types may be used.

I claim:

1. A feed device for moving the slide carrying the cutting blade or the tool in veneer cutting machines, lathes, cutting machines and the like with the aid of screw spindle and nut to which can be imparted rotary movements independent of each other, characterized by mechanisms and arrangements by means of which the said movements during the working of the machine can be changed relatively to each other, so that the slide is fed forwards, returned and advanced rapidly or brought to a standstill.

2. A feed device as claimed in claim 1, characterized by the provision of at least two parallel screw spindles with nuts for moving the slide, rotary motion being transmitted to each of the said nuts independently of one another from the same driving member in order that the slide may be moved uniformly.

3. A form of the feed device as claimed in claims 1 and 2, characterized by the combination of nuts which are journalled in the frame of the machine and are rotated in an unchanged direction and co-operate with screw spindles journalled in the slide in order to impart to the slide the feed movement necessary for the cutting operation, toothed gearings or the like connecting the said spindles, means for locking the spindles against rotation whereby the slide is advanced, means for disengaging the spindles whereby no advancing of the slide is effected, means for advancing the spindles manually and means for rotating the screw spindles mechanically in the one or the other direction for returning the slide or advancing the same rapidly.

4. A feed device as claimed in claim 3, characterized by means adapted to disconnect the coupling locking the screw spindles automatically at the end of the feeding of the slide and connect and disconnect the coupling effecting the returning of the slide and the rapid advancing of the slide.

5. A modification of the feed device as claimed in claim 3, characterized by the fact that the screw spindles are journalled in the frame of the machine and are each rotated in an unchanged direction by the driving shaft of the machine with the aid of a motion-transmitting device and that the nuts are journalled in the slide and by suitable means may be respectively locked, disengaged or rotated in the one or the other direction for the obtaining of the functions stated in claim 3.

In testimony whereof I have affixed my signature in presence of two witnesses:

ERNST SIGURD DETLOF VON SEGEBADEN.

Witnesses:
ROBERT APELGREN,
L. STUDE.